United States Patent
Lee et al.

(10) Patent No.: US 7,474,858 B2
(45) Date of Patent: Jan. 6, 2009

(54) DUOBINARY OPTICAL TRANSMISSION DEVICE USING AT LEAST ONE SEMICONDUCTOR OPTICAL AMPLIFIER

(75) Inventors: Han-Lim Lee, Seoul (KR); Gyu-Woong Lee, Suwon-si (KR); Yun-Je Oh, Yongin-si (KR); Seong-Taek Hwang, Pyeongtaek-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 569 days.

(21) Appl. No.: 10/849,070

(22) Filed: May 19, 2004

(65) Prior Publication Data
US 2005/0047797 A1 Mar. 3, 2005

(30) Foreign Application Priority Data
Aug. 27, 2003 (KR) .................. 10-2003-0059537

(51) Int. Cl.
*H04B 10/00* (2006.01)
(52) U.S. Cl. .................. 398/183; 398/186; 398/189
(58) Field of Classification Search .......... 398/182–201
See application file for complete search history.

(56) References Cited

U.S. PATENT DOCUMENTS

| | | | | |
|---|---|---|---|---|
| 6,628,855 | B1 * | 9/2003 | Shen et al. ............. | 385/15 |
| 6,970,655 | B2 * | 11/2005 | Ono et al. ............. | 398/186 |
| 7,068,948 | B2 * | 6/2006 | Wei et al. ............. | 398/184 |
| 2002/0033984 | A1 * | 3/2002 | Yonenaga et al. ....... | 359/180 |
| 2002/0171900 | A1 | 11/2002 | Ono et al. | |

FOREIGN PATENT DOCUMENTS

| | | |
|---|---|---|
| EP | 1271808 A2 | 1/2003 |
| JP | 10-112688 | 4/1998 |
| JP | 2000-081597 | 3/2000 |
| JP | 2002-077059 | 3/2002 |
| JP | 2002-258228 | 9/2002 |

(Continued)

OTHER PUBLICATIONS

"Optical Duobinary Transmission System Featuring Improved Receiver Sensitivity and Reduced Optical Bandwidth;" Hoon Kim et al.; IEEE Photonics Technology Letters, vol. 14, No. 8; Aug. 2002; XP 001132249; 3 pgs.

(Continued)

*Primary Examiner*—Agustin Bello
(74) *Attorney, Agent, or Firm*—Cha & Reiter, LLC (57) ABSTRACT

A duobinary optical transmission device provides duobinary optical transmission with improved quality by a technique that does not require an electrical low pass filter LPF. A duobinary optical transmission device includes at least one semiconductor optical amplifier (SOA). A light source outputs a carrier wave as an optical signal. A precoder encodes an input of a non-return-to-zero (NRZ) electrical signal. An interferometer type semiconductor optical amplification unit modulates the carrier wave according to a change of an applied bias current coupled to the encoded signal. An optical band pass filter (OBPF) receives the phase-modulated optical signal from the semiconductor optical amplification unit, filters the received phase-modulated optical signal according to a designated band, and outputs an optical duobinary signal.

10 Claims, 9 Drawing Sheets

FOREIGN PATENT DOCUMENTS

| | | |
|---|---|---|
| JP | 2003-506726 | 2/2003 |
| JP | 2003-087201 | 3/2003 |
| KR | 10-112688 | 4/1998 |
| KR | 2000-081597 | 3/2000 |
| KR | 2003-087201 | 3/2003 |

OTHER PUBLICATIONS

"Demonstration of Optical Duobinary Transmission System Using Phase Modulator and Optical Filter;" Hoon Kim et al.; IEEE Photonics Technology Letters, vol. 14, No. 7; Jul. 2002; XP 001131497; 3 pgs.

* cited by examiner

DUOBINARY OPTICAL TRANSMISSION DEVICE USING AT LEAST ONE SEMICONDUCTOR OPTICAL AMPLIFIER

CLAIM OF PRIORITY

This application claims priority to an application entitled "DUOBINARY OPTICAL TRANSMISSION DEVICE USING AT LEAST ONE SEMICONDUCTOR OPTICAL AMPLIFIER," filed in the Korean Intellectual Property Office on Aug. 27, 2003 and assigned Serial No. 2003-59537, the contents of which are hereby incorporated by reference.

BACKGROUND OF THE INVENTION

1. Field of the Invention

The present invention relates to a duobinary optical transmission device using a duobinary optical transmission technique. More particularly, the present invention relates to a duobinary optical transmission device using at least one semiconductor optical amplifier (SOA).

2. Description of the Related Art

An optical transmission system based on dense wavelength division multiplexing (DWDM) transmits an optical signal comprising a plurality of channels having different wavelengths that are transmitted on a single optical fiber, thereby increasing the transmission efficiency. Due to the fact that the optical transmission system can transmit the optical signal irrespective of a transmission speed, there has been a recent increase in the use of very high-speed Internet networks, and such networks have recently increased transmission capacity in order to meet demand. Already, there is a known system that transmits at least 100 channels through a single optical fiber using the DWDM which has been commercialized. Research on a system having a transmission speed of 10 Tbps or more for simultaneously transmitting at least 200 40-Gbps channels to the single optical fiber is being actively conducted.

However, the extension of transmission capacity in an optical system is limited due to interference and distortion between channels at a channel interval of 50 GHz or less at the time of performing optical intensity modulation using existing non-return-to-zero (NRZ) protocol. The interference and distortion is related both to increased data traffic and high-speed data transmission demands of 40 Gbps or more. When a direct current (DC) frequency component of an existing binary NRZ transmission signal and a high-frequency component transmitted by spread spectrum modulation are propagated in an optical fiber medium, problems associated with non-linearity and dispersion are sufficient so as to limit the transmission distance is limited in a high-speed transmission of 10 Gbps or more.

Recently, optical duobinary technology has been attracting interest because many in the field believe that duobinary technology is the one optical transmission technology that may be capable of overcoming the limitations of transmission distances due on account of chromatic dispersion. An important attribute of duobinary transmission is that there is a reduced transmission spectrum in comparison with other conventional optical transmission schemes. In a dispersion-limited system, a transfer distance is inversely proportional to a square of a transmission spectrum bandwidth value. This means that the transfer distance increases four times when a transmission spectrum is reduced by ½. In addition, as a carrier frequency is suppressed within a duobinary transmission spectrum, the limitation of output optical power due to Brillouin scattering stimulated within an optical fiber can be mitigated.

Figure 1:
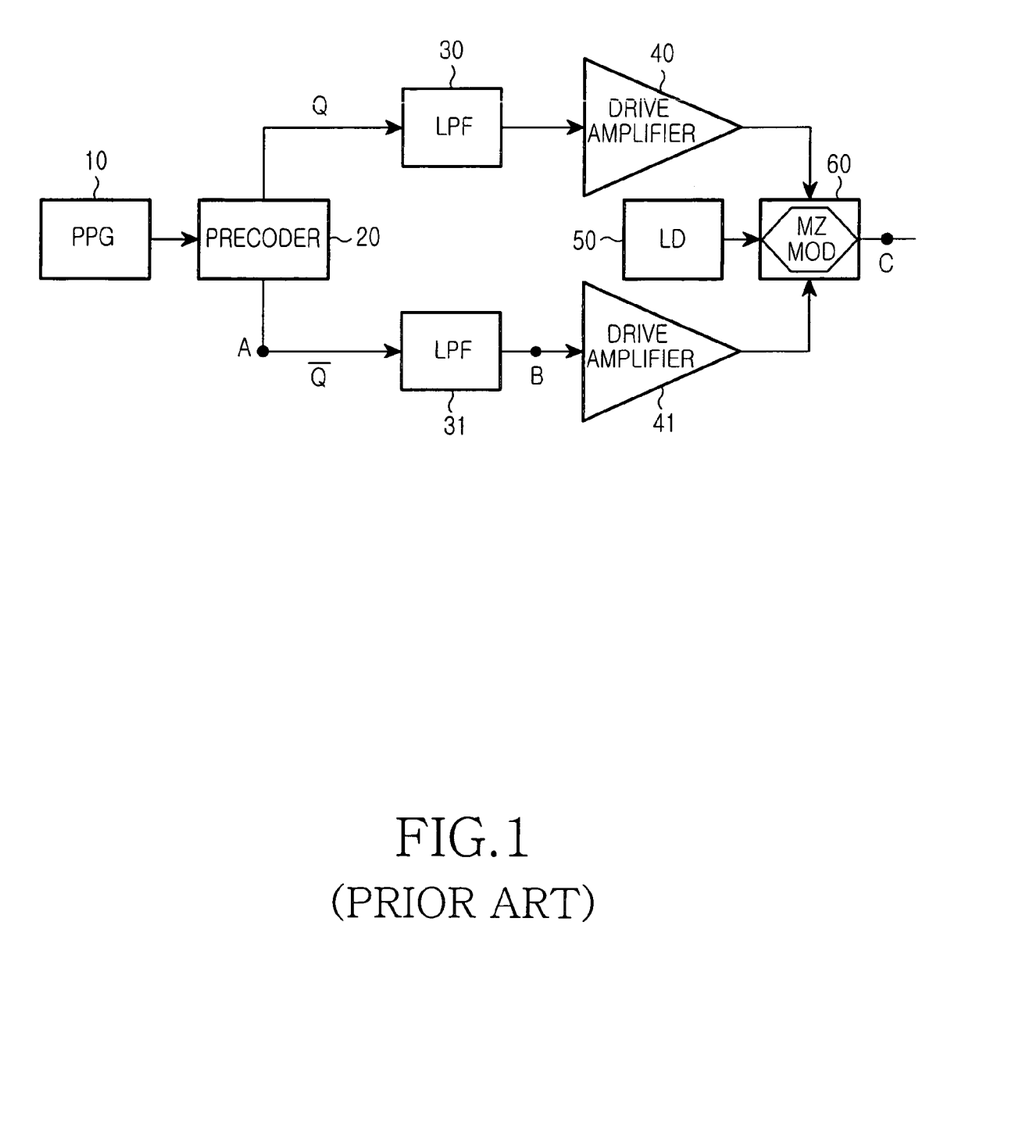
FIG. 1 is a block diagram illustrating one configuration of a conventional duobinary optical transmission device.
Figure 2A:
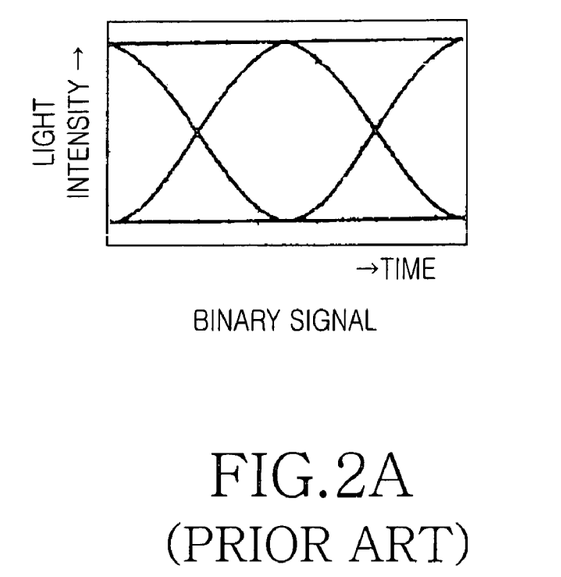
FIGS. 2A to 2C are eye diagrams illustrating output signals of nodes A, B and C shown in FIG. 1.
Figure 2B:
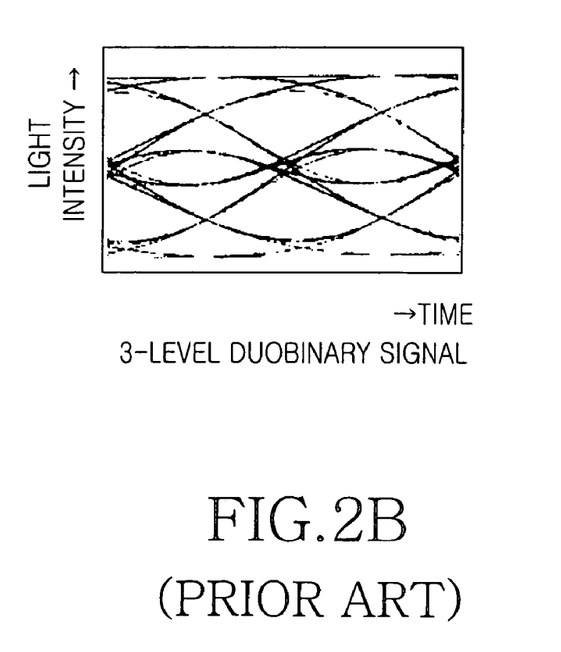
Figure 2C:
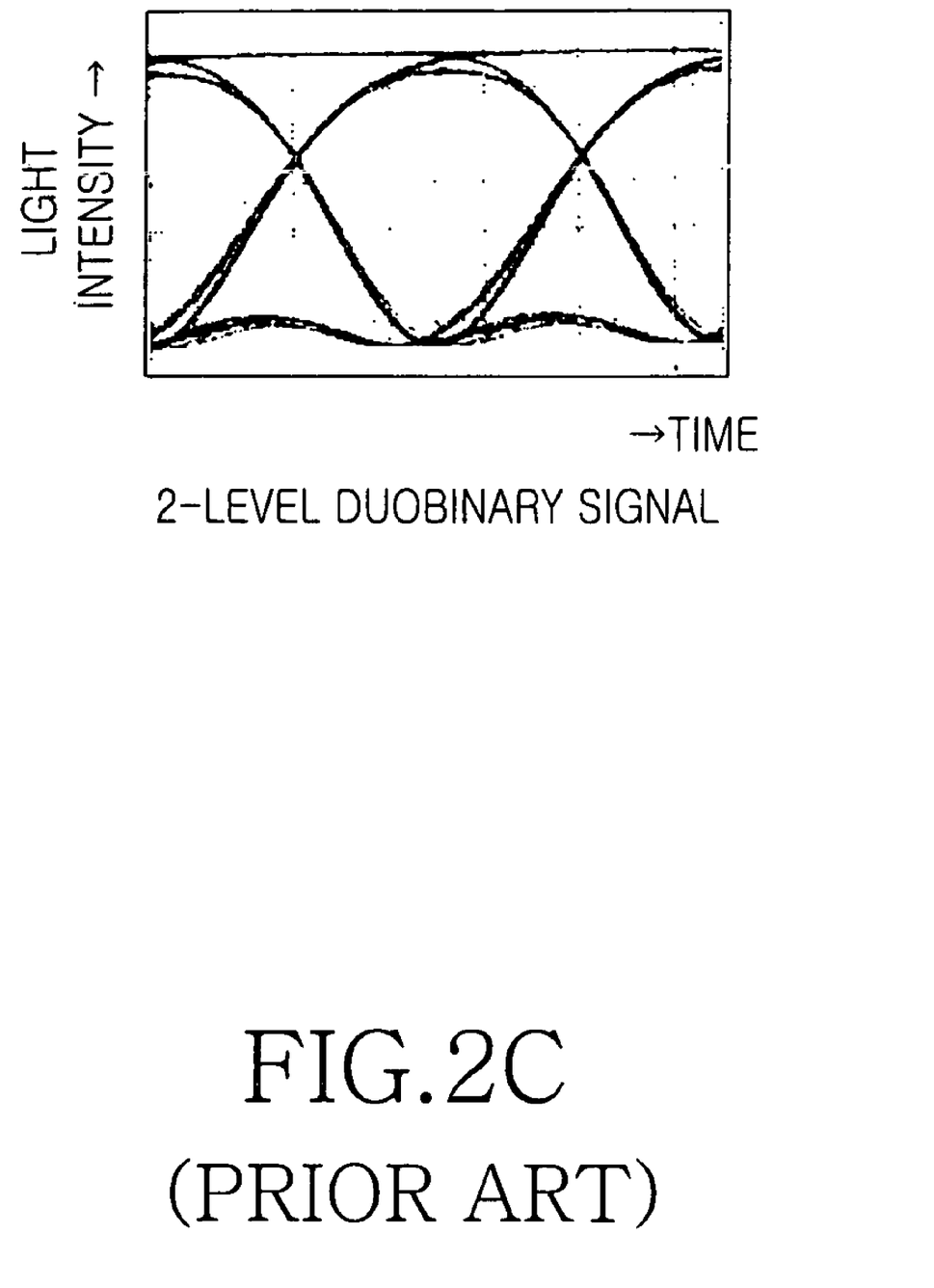

FIG. 1 is a block diagram illustrating one configuration of a conventional duobinary optical transmission device; and FIGS. 2A to 2C are eye (wave) diagrams illustrating output signals of nodes A, B and C shown in FIG. 1. The conventional duobinary optical transmission device will now be described with reference to FIGS. 1 to 2C.

In FIG. 1, the conventional duobinary optical transmission device includes a pulse pattern generator (PPG) 10 for generating a non-return-to-zero (NRZ) electrical pulse signal based on two levels; a precoder 20 for encoding the 2-level NRZ electrical signal; low pass filters (LPFs) 30 and 31 for converting 2-level NRZ electrical signals outputted from the precoder 20 into 3-level electrical signals and reducing bandwidths of the signals; modulator drive amplifiers 40 and 41 for amplifying the 3-level electrical signals and outputting optical modulator drive signals; a laser source or laser diode (LD) 50 for outputting a carrier wave; and a Mach-Zehnder interferometer type optical intensity modulator 60.

The 2-level pulse signal generated by the PPG 10 is encoded by the precoder 20. An output eye diagram at the node A is shown in FIG. 2A. Furthermore, 2-level binary signals outputted from the precoder 20 are input into the LPFs 30 and 31, respectively. The LPFs 30 and 31 have a bandwidth corresponding to approximately ¼ of a clock frequency of the 2-level binary signal, respectively. Interference between codes due to an excessive limit of the bandwidth occurs, and the 2-level binary signals are converted into 3-level duobinary signals because of the interference between codes. An output eye diagram at the node B is shown in FIG. 2B. The 3-level duobinary signals are amplified by the modulator drive amplifiers 40 and 41, and the amplified 3-level duobinary signals are used as signals for driving the Mach-Zehnder interferometer type optical intensity modulator 60. A phase and light intensity of the carrier wave output from the laser source 50 are modulated according to the drive signals input into the Mach-Zehnder interferometer type optical intensity modulator 60, such that an optical duobinary signal based on two levels is outputted. An output eye diagram at the node C is shown in FIG. 2C. In FIG. 1, "$\overline{Q}$" denotes an inversion signal of "Q". The 3-level duobinary signals are inputted into the Mach-Zehnder interferometer type optical intensity modulator 60 through the LPFs and the drive amplifiers, respectively.

The Mach-Zehnder interferometer type optical intensity modulator is often based on a Z-cut structure and an X-cut structure according to an arm structure. As shown in FIG. 1, the Mach-Zehnder interferometer type optical intensity modulator based on the Z-cut structure having dual arms is coupled to the electrical LPFs 30 and 31 and the modulator drive amplifiers 40 and 41 at both the arms so that the 3-level electrical signals can be applied to both the arms. The Mach-Zehnder interferometer type optical intensity modulator based on the X-cut structure having a single arm (not shown) is coupled to an electrical LPF and a modulator drive amplifier at the single arm so that a 3-level signal can be applied to the single arm.

However, the conventional structure is significantly affected by a pseudo-random bit sequence (PRBS) because the 3-level electrical signal is output by the electrical LPF therein. As the length of the PRBS increases, transmission characteristics are further degraded, such that it is difficult for the system to be implemented. In particular, a system margin is significantly reduced in case of a $2^{31}-1$ PRBS rather than a $2^{7}-1$ PRBS. Conventionally, a slope in the case where an applied NRZ signal is changed from a "0" level to a "1" level is different from that in the case where the applied NRZ signal is changed from the "1" level to the "0" level. However, there is a structural problem in that a shift from the "0" level to the "1" level, or a shift from the "1" level to the "0" level occurs and hence the jitter of an output waveform increases, because many parts having differing slopes are combined in case of a duobinary optical transmitter using the electrical LPF. This problem occurs in the conventional Z-cut or X-cut structure. The dependence of this signal pattern causes the system margin to be limited when optical transmission is performed.

Figure 3:
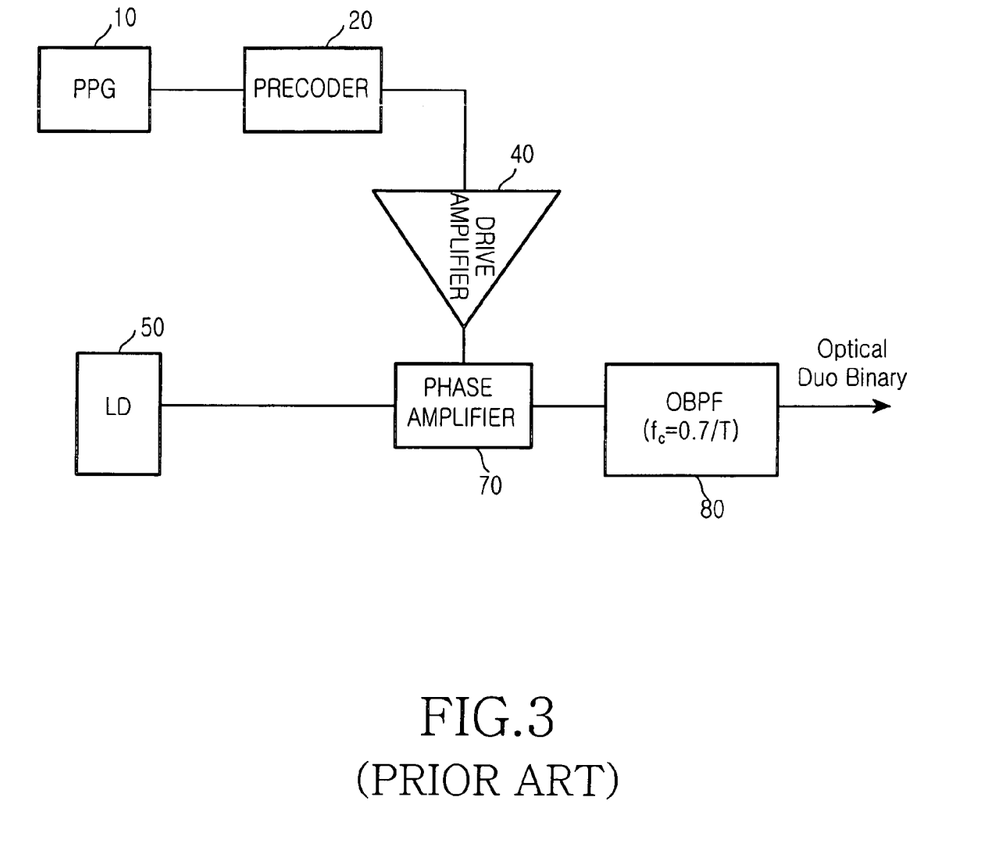
FIG. 3 is a block diagram illustrating another configuration of a conventional duobinary optical transmission device.

In order for the above-described problem to be addressed, a structure in which no electrical LPF is used has been proposed. FIG. 3 shows an example of another configuration of a conventional duobinary optical transmitter using a phase modulator and an optical band pass filter (OBPF). The conventional duobinary optical transmitter shown in FIG. 3 includes a pulse pattern generator (PPG) 10, a precoder 20, a modulator drive amplifier 40 and a laser source or laser diode (LD) 50, similar to that which is shown in FIG. 1. However, the conventional duobinary optical transmitter shown in FIG. 3 uses no electrical LPF, but does include a phase modulator 70 and an optical band pass filter OBPF 80. Thus, the conventional duobinary optical transmitter in FIG. 3 is capable of generating signal characteristics that are similar to the characteristics of the duobinary optical output in FIG. 1.

Another conventional technique that can ensure a constant transmission quality is a technique that transmits according to the length of a pseudo-random bit sequence (PRBS). However, there are problems in this conventional technique in that an expensive phase modulator must be used, which does not permit implementation of a cost-effective transmission device.

SUMMARY OF THE INVENTION

Therefore, the present invention provides a duobinary optical transmission device using at least one semiconductor optical amplifier whose output does not have its transmission quality and bit pattern dependent upon the filter transmission characteristics of the filter used, as in the conventional duobinary optical transmitter. In addition, the present invention provides an improvement in transmission, particularly with regard to improve non-linearity and dispersion characteristics of non-return-to-zero (NRZ) transmission.

In accordance with an aspect of the present invention, the above functions can be accomplished by the provision of a duobinary optical transmission device using at least one semiconductor optical amplifier (SOA) comprising: a light source for output of a carrier wave as an optical signal; a precoder for encoding an input non-return-to-zero (NRZ) electrical signal; an interferometer type semiconductor optical amplification unit for modulating a phase of the carrier wave according to a change in an applied bias current coupled to the encoded signal; and an optical band pass filter (OBPF) for receiving the phase-modulated optical signal from the semiconductor optical amplification unit, filtering the received phase-modulated optical signal according to a designated band, and output of an optical duobinary signal.

Preferably, the semiconductor optical amplification unit comprises an interferometer for branching input light, combining the branched input light, and outputting a combined signal; at least one semiconductor optical amplifier (SOA) arranged on at least one arm of the interferometer; and at least one bias tee for supplying a bias current and a modulation current to the at least one SOA.

BRIEF DESCRIPTION OF THE DRAWINGS

The above and other features, as well as some of the many advantages of the present invention will be more clearly understood from the following detailed description taken in conjunction with the accompanying drawings, in which.

DETAILED DESCRIPTION OF THE INVENTION

Now, several aspects and advantages of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make obscure the subject matter of the present invention.

Figure 4:
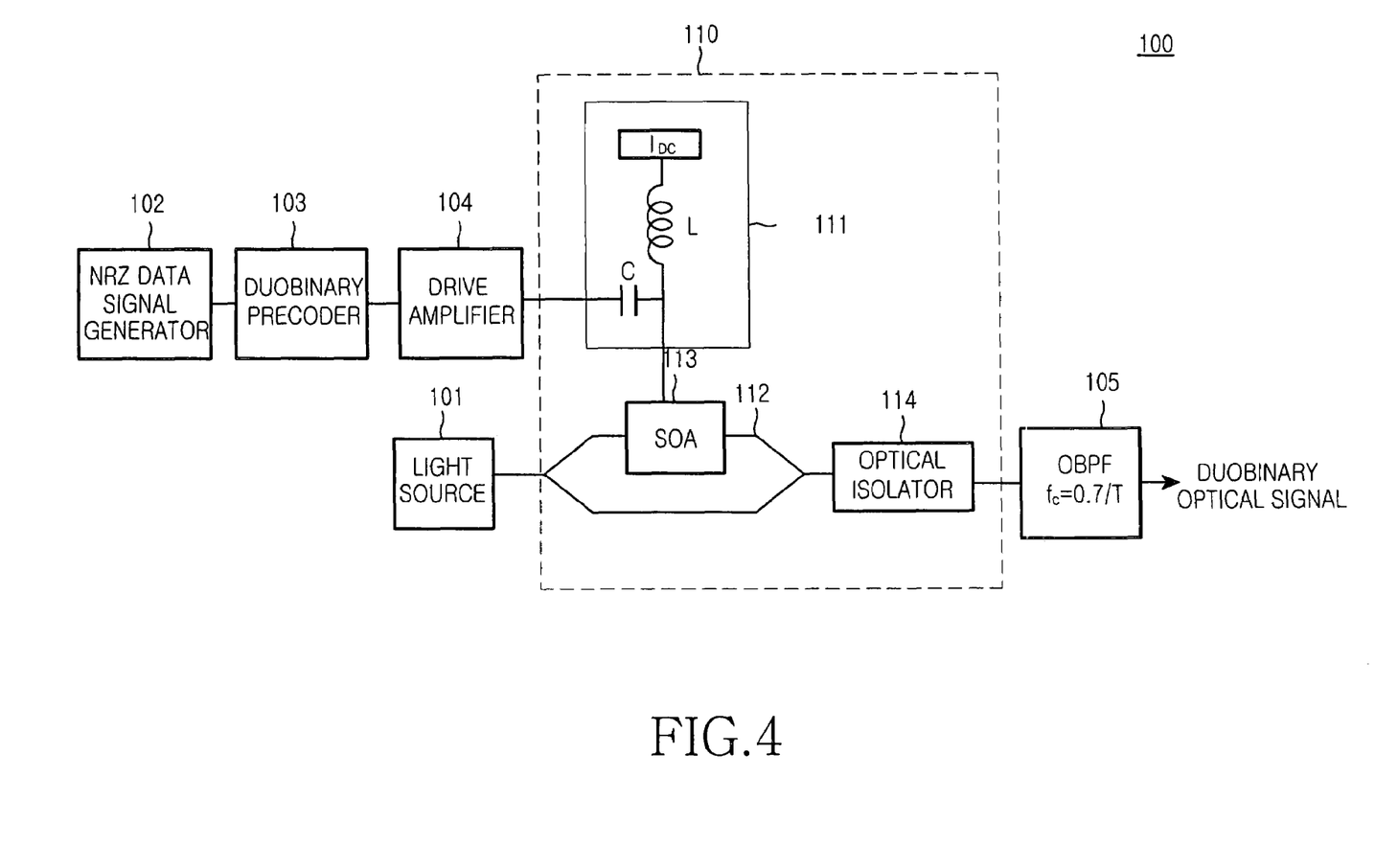
FIG. 4 is a block diagram illustrating the configuration of a duobinary optical transmission device using a semiconductor optical amplifier in accordance with the first aspect of the present invention.

FIG. 4 is a block diagram illustrating the configuration of a duobinary optical transmission device 100 using a semiconductor optical amplifier (SOA) in accordance with a first aspect of the present invention.

Referring to FIG. 4, one example of the duobinary optical transmission device 100 of the present invention includes a light source 101 for outputting a carrier wave; a signal generator 102 for generating a non-return-to-zero (NRZ) data or electrical signal; a duobinary precoder 103 for encoding the NRZ electrical signal output from the signal generator 102; an interferometer type semiconductor optical amplification unit 110 for modulating a phase of the carrier wave according to a gain change based on an applied bias current coupled to the encoded signal; and an optical band pass filter (OBPF) 105 for receiving a phase-modulated optical signal from the semiconductor optical amplification unit 110, filtering the optical signal according to a designated band, and outputting an optical duobinary signal. Furthermore, the duobinary optical transmission device 100 includes a drive amplifier 104 for amplifying the encoded signal and outputting the amplified encoded signal.

The light source 101 generates/outputs the carrier wave and is implemented by a laser diode (LD).

The NRZ data signal generator 102 generates an NRZ data signal based on two levels, and can be implemented by a pulse pattern generator (PPG) generating an electrical pulse signal, etc.

The duobinary precoder 103 encodes the 2-level NRZ data signal.

The drive amplifier 104 amplifies the encoded signal and outputs the amplified encoded signal. The amplified encoded signal serves as a drive signal of the semiconductor optical amplification unit 110.

The semiconductor optical amplification unit 110 modulates the phase of the carrier wave according to an optical amplification gain based on an applied current. The semiconductor optical amplification unit 110 includes a bias tee 111 for supplying a bias current and a modulation current; an interferometer 112; a semiconductor optical amplifier (SOA) 113 arranged at one arm of the interferometer 112; and an optical isolator 114. The optical isolator 114 minimizes an inverse reflection of light outputted from the SOA 113.

The OBPF 105 performs the function of receiving a phase-modulated optical signal from the semiconductor optical amplification unit 110 and filtering the received optical signal according to a designated band.

Figure 5:
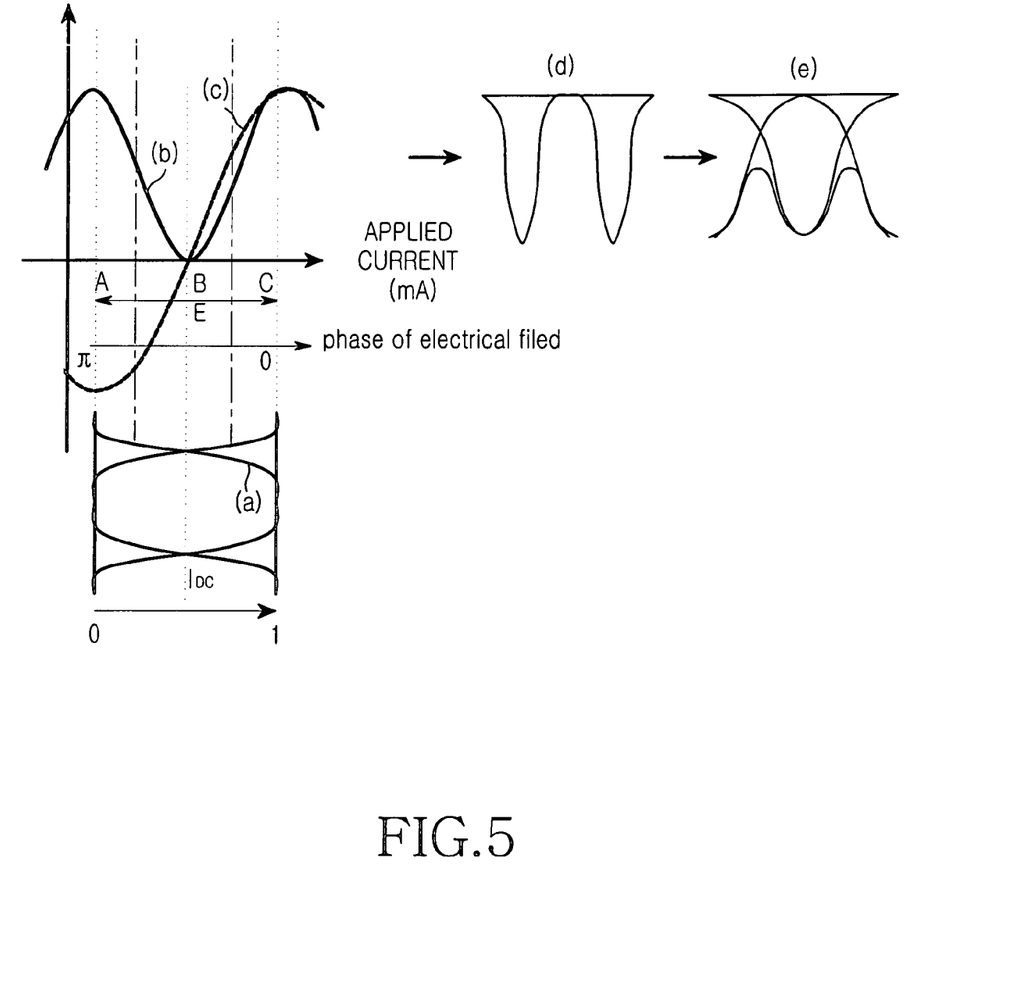
FIG. 5 is an explanatory view illustrating a modulation process in the duobinary optical transmission device using the semiconductor optical amplifier in accordance with the present invention.

Operation of the duobinary optical transmission device using the SOA constituted as described above will now be described with reference to FIGS. 4 and 5. FIG. 5 is an explanatory view illustrating a modulation process in the duobinary optical transmission device using the SOA in accordance with the present invention.

Referring to FIGS. 4 and 5, the carrier wave generated/output from the laser source 101 is applied to the SOA 113 arranged at one arm of the interferometer 112 coupled to the bias tee 111. Furthermore, an NRZ electrical signal (indicated by (a) in FIG. 5) generated from the NRZ data signal generator or PPG 102 is encoded by the duobinary precoder 103, and the encoded signal is amplified by the drive amplifier 104. The amplified encoded signal is combined with a bias direct current $I_{DC}$, and the combined signal is applied to the SOA 113 arranged at one arm of the interferometer 112. On the other hand, only the carrier wave goes through the other arm of the interferometer 112 without a phase change. If signals of both the arms are combined at an output of the interferometer 112, then both constructive interference and destructive interference occur, and "(b)" and "(c)" shown in FIG. 5 denote characteristic curves of an electric field. A t this point, when the applied current is varied within a range between "A" and "C" having the center "B" shown in FIG. 5, an optical output indicated by "(d)" shown in FIG. 5 has the same magnitude (i.e., maximum output) at a sampling point irrespective of a bit "0" or "1". On the other hand, the presence of an electric field endures phase modulation having a phase difference of "0" or "π" (as indicated by "(c)" shown in FIG. 5). The magnitude of the applied current is referred to as a modulation index of the optical amplifier. When the modulation index is adjusted, phase change characteristics of an optical signal can then be adjusted. When a phase shift keying (PSK) optical output after the phase modulation goes through the OBPF 105 based on a bandwidth that is a 0.7 multiple of a data transmission bit rate, the duobinary transmitter of the present invention performs the same function using the electrical LPF. Thus, an optical signal going through the OBPF is converted into a duobinary signal (as indicated by "(e)" in FIG. 5). In this aspect of the invention, the case where the bandwidth of the OBPF 105 is a 0.7 multiple of a data transmission bit rate has been described as an example. However, the transmission characteristics of an optical duobinary signal can be adjusted by adjusting the bandwidth of the OBPF 105.

Figure 6:
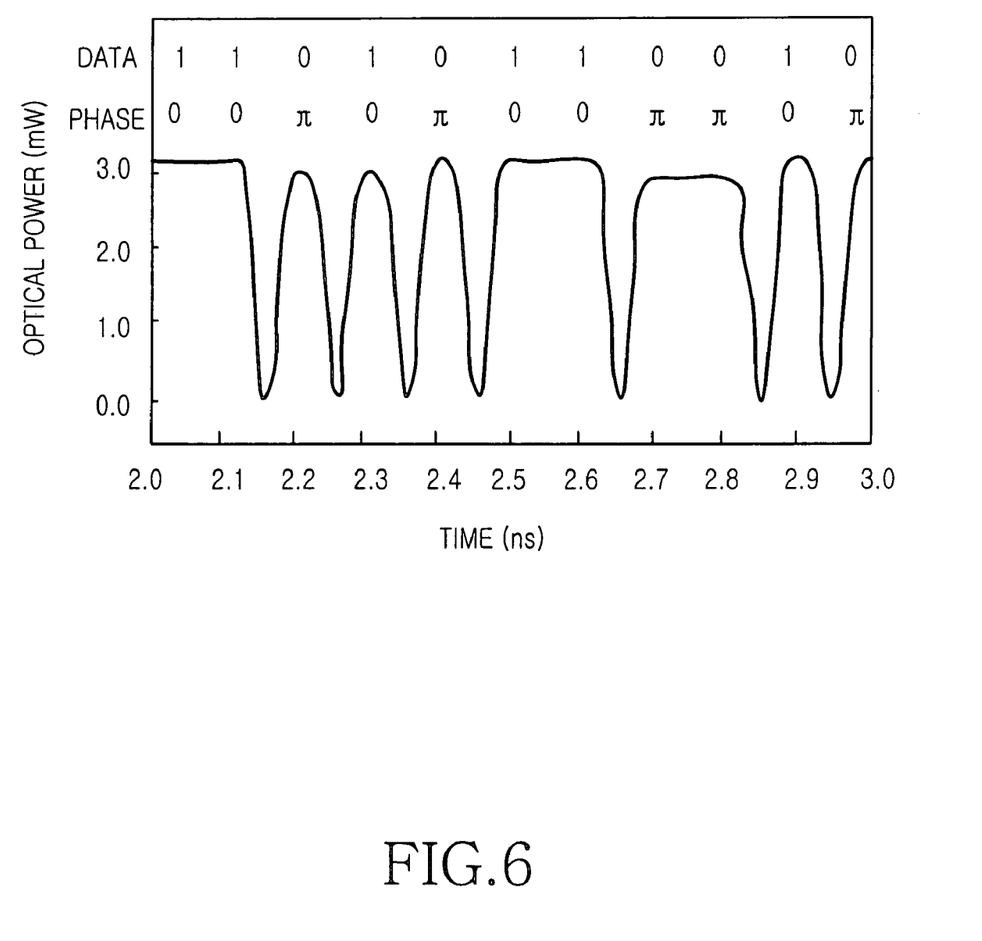
FIG. 6 is an explanatory view illustrating a bit sequence of a phase-modulated optical signal in accordance with the present invention.

FIG. 6 illustrates a bit sequence of a phase-modulated optical signal in accordance with the present invention. In FIG. 6, it can be found that a bit "0" or "1" is converted into phase information having a phase of "0" or "π" in an electric field at the time of modulation.

Figure 7:
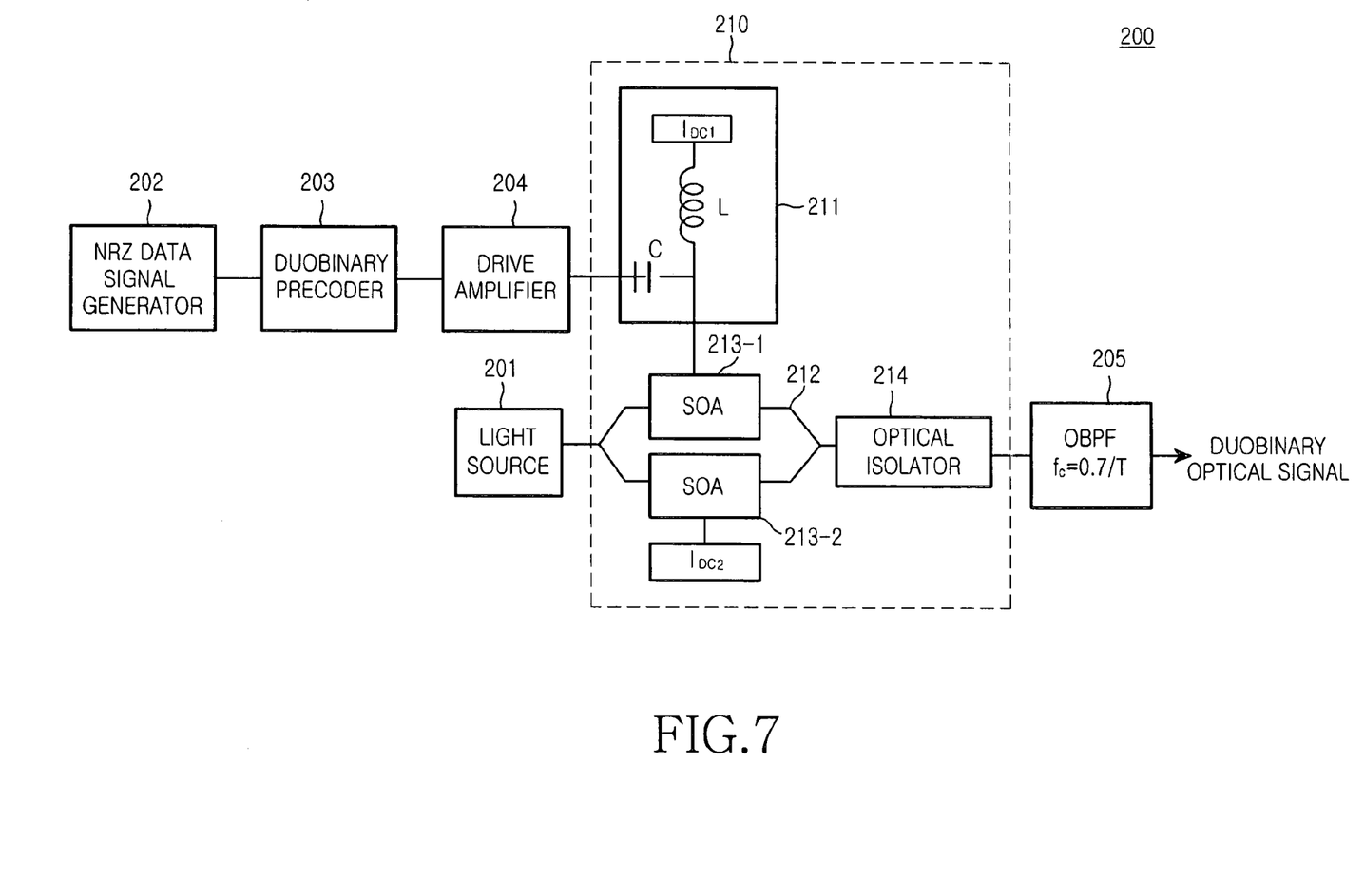
FIG. 7 is a block diagram illustrating the configuration of a duobinary optical transmission device using semiconductor optical amplifiers in accordance with another aspect of the present invention.

FIG. 7 is a block diagram illustrating the configuration of a duobinary optical transmission device 200 using semiconductor optical amplifiers (SOAs) in accordance with a second aspect of the present invention.

Referring to FIG. 7, the duobinary optical transmission device 200 includes a light source 201 for outputting a carrier wave; a signal generator 202 for generating an NRZ data or electrical signal; a precoder 203 for encoding the NRZ electrical signal; a drive amplifier 204 for amplifying the encoded signal and outputting the amplified encoded signal; a bias tee 211 for supplying a bias current and a modulation current; an interferometer 212; the first and second semiconductor optical amplifiers (SOAs) 213-1 and 213-2 arranged at both arms of the interferometer 212; an optical isolator 214; and an optical band pass filter (OBPF) 205. The configuration of the second aspect shown in FIG. 7 differs from the first aspect highlighted in FIG. 4 in that the SOAs 213-1 and 213-2 are arranged at both arms of the interferometer 212 in the configuration of the second aspect of the invention shown in FIG. 7. Because operation of the second aspect of the invention is similar to that of the first aspect, the same operation description will be omitted.

Figure 8:
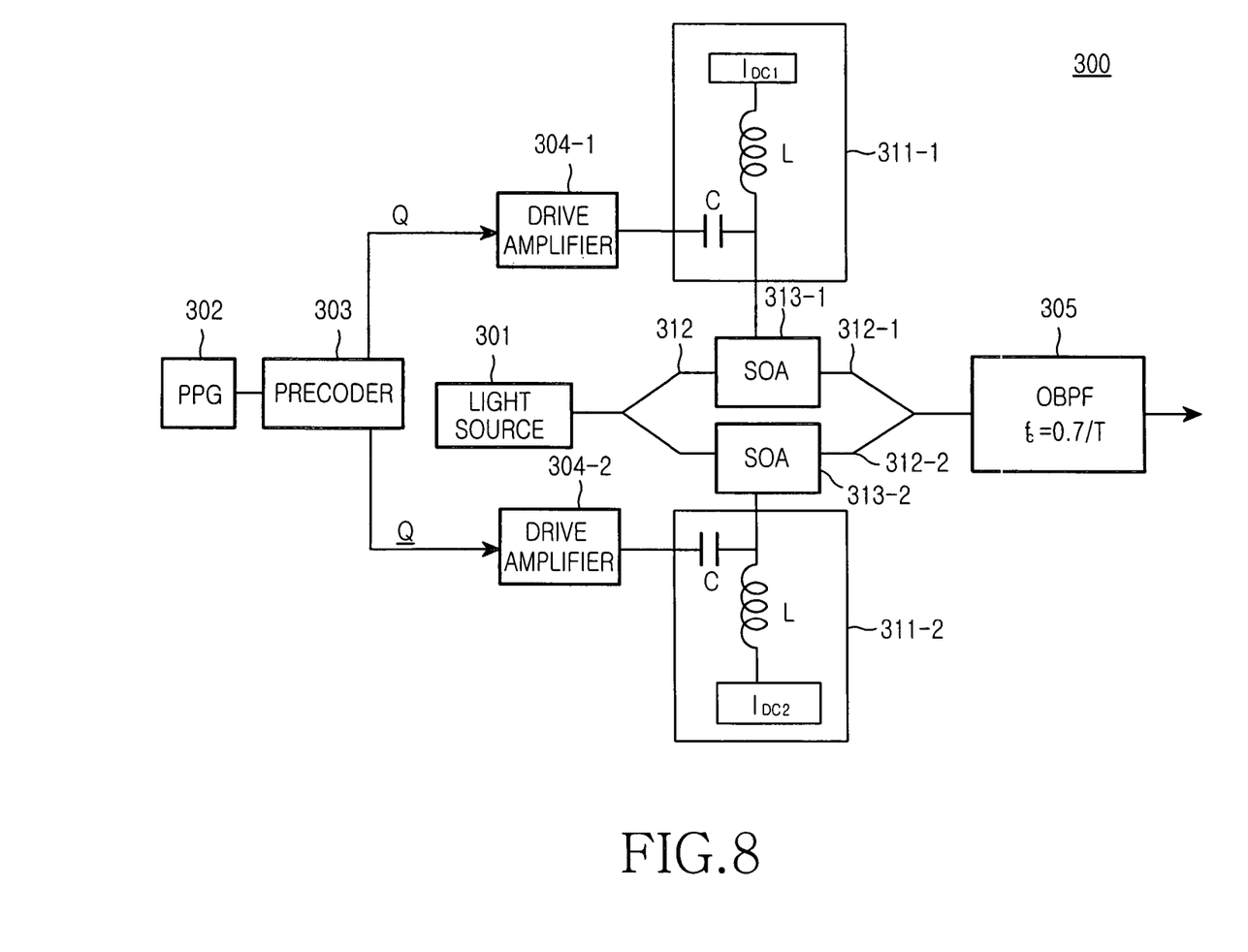
FIG. 8 is a block diagram illustrating the configuration of a duobinary optical transmission device using semiconductor optical amplifiers in accordance with another of the present invention.

FIG. 8 is a block diagram illustrating the configuration of a duobinary optical transmission device 300 using semiconductor optical amplifiers (SOAs) in accordance with the third embodiment of the present invention.

Referring to FIG. 8, the duobinary optical transmission device 300 includes a light source 301 for outputting a carrier wave; a signal generator 302 for generating an NRZ data or electrical signal; a precoder 303 for encoding an NRZ electrical signal to generate signals "Q" and "$\overline{Q}$"; drive amplifiers 304-1 and 304-2 for amplifying the signals "Q" and "$\overline{Q}$" and outputting the amplified signals; bias tees 311-1 and 311-2 for supplying a bias current and a modulation current; an interferometer 312; the first and second semiconductor optical amplifiers (SOAs) 313-1 and 313-2 arranged at both arms of the interferometer 312; and an optical band pass filter (OBPF) 305.

Operation of the duobinary optical transmission device using the SOAs constituted as described above in accordance with a third aspect of the present invention will be described.

The carrier wave generated/outputted from the laser source 301 is applied to the SOAs 313-1 and 313-2 arranged at both of arms 312-1 and 312-2 of the interferometer 312 coupled to the bias tees 311-1 and 311-2. Furthermore, an NRZ electrical signal generated from an NRZ data signal generator or pulse pattern generator (PPG) 302 is encoded by the precoder 303. The signals "Q" and "$\overline{Q}$" are amplified by the drive amplifiers 304-1 and 304-2. The amplified signals are combined with bias direct currents $I_{DC}$, and combined signals are applied to the SOAs 313-1 and 313-2 arranged at both the arms of the interferometer 112, respectively. When the applied current is changed, there is a change in the gain characteristics of the SOAs 313-1 and 313-2 arranged at both the arms 312-1 and 312-2 of the interferometer 312 and hence the phases are also changed. When signals of both of the arms are combined at an output of the interferometer 312, b oth constructive interference and destructive interference occur and has the affect that a phase can be modulated without changing gains of the amplifiers. When a phase shift keying (PSK) optical output after the phase modulation goes through the OBPF 305 based on a bandwidth that has a data transmission bit rate that is a 0.7 multiple of the bandwidth, the duobinary transmitter of the present invention performs the same functions as a duobinary transmitter that uses the electrical LPF. Thus, an optical signal going through the OBPF is converted into a duobinary signal.

As described above, at least one semiconductor optical amplifier (SOA) can be coupled to at least one arm of an interferometer in accordance with various formats. The semiconductor optical amplifier can be designed in a single integration structure together with a semiconductor laser, an optical band pass filter (OBPF), etc.

As apparent from the above description, the present invention provides a duobinary optical transmission device using at least one semiconductor optical amplifier (SOA) that exhibits crossed-phase characteristics of a duobinary signal using at least one interferometer type SOA without requiring an electrical low pass filter (LPF). Thus, the present invention, by elimination the LPF, overcomes the limitation on transmission quality caused by the electrical LP filter. In addition, an optical transmission system can be implemented that is based on high-speed and dense wavelength division multiplexing (DWDM) that requires a level of transmission quality previously unattainable with the use of an LPF.

Furthermore, at least one SOA can be coupled to at least one arm of an interferometer according to various formations. The SOA can be designed in a single integrated structure together with a semiconductor laser, an optical band pass filter (OBPF), etc., such that a size of the optical transmission device of the present invention can be miniaturized and an integrated transmission stage can be appropriately implemented.

Although the aspects of the present invention that have been disclosed were provided for illustrative purposes, and those skilled in the art will appreciate that various modifications, additions and substitutions are possible, without departing from the spirit of the invention and the scope of the appended claims. Therefore, the present invention is not limited to the above-described aspects, but the present invention is defined by the claims which follow, along with their full scope of equivalents.

What is claimed is:

1. A duobinary optical transmission device using at least one semiconductor optical amplifier (SOA), comprising:
    a light source for outputting a carrier wave as an optical signal to at least one SOA;
    a precoder for encoding an input non-return-to-zero (NRZ) electrical signal;
    wherein an interferorneter type semiconductor optical amplification unit comprising said at least one SOA further including;
        a bias input for modulating a phase of the carrier wave according to a change of an applied bias current coupled to the encoded electrical signal output from the precoder;
        an interferometer having a plurality of arms for branching input light, combining the branched input light, and outputting a combined signal,
        said at least one semiconductor optical amplifier (SOA) provided on at least one arm of the interferometer; and
        an optical isolator for preventing light reflection at an output terminal of the SOA; and
    an optical band pass filter (OBPF) for:
        receiving the phase-modulated optical signal from the semiconductor optical amplification unit,
        filtering the received phase-modulated optical signal to adjust the transmission characteristics of an optical signal according to a designated bandwidth, wherein said bandwidth is adapted to adjust transmission characteristics of the optical duobinary signal based on a data transmission bit rate; and
        outputting an optical duobinary signal, wherein the phase-modulated signal has a substantially same power level for "0" and "1" bits of the NRZ electrical signal and has phases of "π" and "0" for "0" and "1" bits of the NRZ electrical signal, respectively.

2. The duobinary optical transmission device as set forth in claim 1, wherein the bias input comprises at least one bias tee for supplying a bias current and a modulation current to the at least one SOA.

3. The duobinary optical transmission device as set forth in claim 1, wherein the interferometer comprises a Mach-Zehnder type interferometer.

4. The duobinary optical transmission device as set forth in claim 1, wherein a modulation index of the at least one SOA is adapted for adjustment so as to change phase characteristics of the optical signal.

5. The duobinary optical transmission device as set forth in claim 1, wherein the optical transmission device outputs an amplified optical duobinary signal without using an electrical low pass filter (LPF) and a phase amplifier.

6. The duobinary optical transmission device as set forth in claim 1, further comprising:
    at least one drive amplifier for amplifying the encoded signal and outputting the amplified encoded signal.

7. The duobinary optical transmission device as set forth in claim 1, wherein the at least one SOA has a single integrated structure together with the OBPF.

8. The duobinary optical transmission device as set forth in claim 2, further comprising:
    at least one drive amplifier for amplifying the encoded electrical signal output from the precoder and outputting the arnplificd encoded signal,
    wherein the at least one SOA is arranged on at two arms of said plurality of arms,
    wherein the at least one bias tee is coupled to the amplified encoded signal and supplies the bias current and the modulation current to one SOA arranged at a first arm of the plurality of arms, and
    wherein only the bias current is supplied to the other SOA arranged at a second arm of the plurality of arms.

9. The duobinary optical transmission device as set forth in claim 2, further comprising:
    first and second drive amplifiers each amplifying the encoded electrical signal and outputting the amplified encoded signal,
    wherein the at least one SOA comprises two SOAs, each of the respective SOAs being arranged on a respective one of the plurality of arms, and
    wherein said at least one bias tee comprises two bias tees, each of the two bias tees being respectively coupled to the encoded signal amplified by one of the first and second drive amplifiers, respectively, and for supplying the bias current and the modulation current to each of the at least one SOA.

10. The duobinary optical transmission device as set forth in claim 1, wherein said bandwidth comprises a 0.7 multiple of the data transmission bit rate for a phase shift keying (PSK) optical output signal.

* * * * *